US007930324B2

(12) United States Patent
Kenyon

(10) Patent No.: US 7,930,324 B2
(45) Date of Patent: Apr. 19, 2011

(54) INFORMATION ORGANIZATION AND NAVIGATION BY USER-GENERATED ASSOCIATIVE OVERLAYS

(75) Inventor: Jeffrey D. Kenyon, Boulder, CO (US)

(73) Assignee: Qwest Communications International, Inc., Denver, CO (US)

( * ) Notice: Subject to any disclaimer, the term of this patent is extended or adjusted under 35 U.S.C. 154(b) by 102 days.

(21) Appl. No.: 11/687,232

(22) Filed: Mar. 16, 2007

(65) Prior Publication Data

US 2007/0176947 A1 Aug. 2, 2007

Related U.S. Application Data

(60) Division of application No. 10/649,525, filed on Aug. 27, 2003, now Pat. No. 7,209,928, which is a continuation-in-part of application No. 09/124,540, filed on Jul. 29, 1998, now Pat. No. 6,792,430.

(51) Int. Cl.
*G06F 17/30* (2006.01)

(52) U.S. Cl. .......................... 707/805; 715/776; 715/230

(58) Field of Classification Search .................. 707/3, 4, 707/8, 10, 100, 102, 104.1, 200, 791, 796, 707/803, 805, 999.107; 715/205, 206, 208, 715/700, 738, 739, 744, 745, 225, 230–232, 715/235, 269, 275, 776, 781, 808, 809; 709/202, 709/228

See application file for complete search history.

(56) References Cited

U.S. PATENT DOCUMENTS

| | | | |
|---|---|---|---|
| 4,739,477 A | 4/1988 | Barker et al. | |
| 4,868,733 A | 9/1989 | Fujisawa et al. | |
| 5,159,669 A | 10/1992 | Trigg et al. | |
| 5,250,929 A | 10/1993 | Hoffman et al. | |
| 5,404,506 A | 4/1995 | Fujisawa et al. | |
| 5,473,744 A | 12/1995 | Allen et al. | |
| 5,577,188 A | 11/1996 | Zhu | |
| 5,602,985 A | 2/1997 | Ishida | |
| 5,644,740 A | 7/1997 | Kiuchi | |
| 5,684,969 A | 11/1997 | Ishida | |
| 5,696,916 A | 12/1997 | Yamazaki et al. | |
| 5,715,416 A | 2/1998 | Baker | |
| 5,812,134 A | 9/1998 | Pooser et al. | |
| 5,826,025 A * | 10/1998 | Gramlich | 709/217 |
| 5,900,870 A | 5/1999 | Malone et al. | |
| 5,918,233 A * | 6/1999 | La Chance et al. | 707/104.1 |
| 6,044,368 A * | 3/2000 | Powers | 707/2 |
| 6,088,032 A * | 7/2000 | Mackinlay | 715/848 |
| 6,457,018 B1 * | 9/2002 | Rubin | 707/4 |
| 6,792,430 B1 | 9/2004 | Kenyon et al. | |

(Continued)

OTHER PUBLICATIONS

Vannevar, Bush, "As We May Think," Atlantic Monthly, Jul. 1945; 176(1), pp. 101-108.

(Continued)

*Primary Examiner* — Greta L Robinson

(57) ABSTRACT

Digital information objects in a digital information space are linked through the use of an overlay. A dynamic association between an accessed digital information object and each concept node in the overlay is established if the accessed digital information object and the overlay include at least one common concept. Links to other digital information objects are displayed if those objects are represented by information nodes within the overlay linked to a concept node expressing a common concept. At least a portion of the overlay may be exported for incorporation into other overlays or for various information processing functions.

18 Claims, 8 Drawing Sheets

U.S. PATENT DOCUMENTS 6,820,094 B1 * 11/2004 Ferguson et al. ............. 707/200
7,209,928 B2 4/2007 Kenyon
2003/0084052 A1 5/2003 Peterson

OTHER PUBLICATIONS

Chen et al., "Automatic Construction of Networks of Concepts Characterizing Document Databases," IEEE 1992, pp. 885-902.
Vannevar, Bush, "As We May Think," Atlantic Monthly, Jul. 1945; 176(1), pp. 101-108.
Chen et al. "Automatic Construction of Networks of Concepts Characterizing Document Databases," IEEE 1992, pp. 885-902.
U.S. Appl. No. 09/124,540, Amended Appeal Brief dated Oct. 3, 2001, 22 pages.
U.S. Appl. No. 09/124,540, Advisory Action dated Feb. 7, 2001, 2 pages.
U.S. Appl. No. 09/124,540, Decision on Appeal dated Mar. 17, 2004, 7 pages.
U.S. Appl. No. 09/124,540, Examiner's Answer dated Nov. 23, 2001, 8 pages.
U.S. Appl. No. 09/124,540, Notice of Allowance dated Jul. 6, 2004, 3 pages.
U.S. Appl. No. 09/124,540, Notice of Appeal dated Apr. 2, 2001, 2 pages.
U.S. Appl. No. 09/124,540, Notice of Non-Compliance dated Aug. 22, 2001, 6 pages.
U.S. Appl. No. 09/124,540, Office Action dated Jan. 2, 2001, 4 pages.
U.S. Appl. No. 09/124,540, Office Action dated Oct. 3, 2000, 12 pages.
U.S. Appl. No. 10/649,525, Office Action dated Mar. 31, 2006, 8 pages.
U.S. Appl. No. 10/649,525, Request for Restriction/Election dated Aug. 27, 2003, 5 pages.
U.S. Appl. No. 10/649,525, Response to Restriction Requirement dated Nov. 9, 2006, 2 pages.
U.S. Appl. No. 10/649,525, Notice of Allowance dated Jan. 24, 2007, 8 pages.

* cited by examiner

Overlays: An Introduction

Back in 1945, Vannevar Bush described machine he called a memex. The memex (which was never built) was a desk-sized machine designed to help a scientist manage and interlink a constantly growing corpus of knowledge. The paper in which the memex was described is a classic work, often cited as an early prototype of the World Wide Web (WWW).

There's just one problem... you still cannot, to this day, do what Bush was describing with the WWW. At least not with the browsers currently available. Bush's point was not that we need access to more information, or needed faster access to information, it was that we need tools that will allow us to make sense of a corpus of scientific and technical knowledge that is growing at an ever increasing pace. A tool that enables *personal knowledge management*.

Overlays are my solution to the problem Bush proposed. Overlays, implemented at the browser level, would allow you to do everything Bush described in his article. In addition, they'll let you do something else. *they allow you to see new information in relation to existing information that you've already classified as valuable*. Think of it as an entirely new method of navigation, augmenting what the author has provided.

An author typically sticks hyperlinks into a document to show how other documents fit into the author's mental model of a particular subject. The reader is compelled to either (a) follow the author's links, or (b) remember that they've already seen some relevant information and go hunting for it in their bookmarks. But what if that remembering and hunting process could be automated?.

For example, if I opened a WWW page by someone with the words knowledge management in the page, the idea of the overlay would be to create, automatically, a *reader-defined* link that would allow the user to instantly be reminded of, and access, all related BRINT (KM and OL) ady declared to be interesting.

Knowledge management at Quest

Organizational Learning

On this page, as you may have guessed, the words that look like they were marked with a mouse onto the link, and note the pop-up menus that appear. Menu selections may bring up WWW sites, or bring up select concepts (in this case, Organizational Learning)

Organizational Learning and COPs ve your (Brown and Duguid)

SOL Home Page

The manner in which an overlay link is defined is easily configurable to accommodate visual impairment, personal preferences, and to avoid confusion between author and reader defined links.

INFORMATION ORGANIZATION AND NAVIGATION BY USER-GENERATED ASSOCIATIVE OVERLAYS

CROSS-REFERENCE TO RELATED APPLICATIONS

This application is a division of U.S. application Ser. No. 10/649,525 filed Aug. 27, 2003, which is a continuation-in-part of U.S. application Ser. No. 09/124,540 now U.S. Pat. No. 6,792,430 filed Jul. 29, 1998, which is hereby incorporated by reference in its entirety.

BACKGROUND OF THE INVENTION

1. Field of the Invention

The present invention relates to organization and navigation of digital information objects of a digital information space.

2. Background Art

In a data space containing hypertext such as, for example, the World Wide Web (WWW), authors link to one another's documents or pages. A user navigates through the digital information space by either following these author-defined links, searching for specific terms (as supported by search engines), or through their own "bookmarks" or pointers to specific pages.

Currently, upon locating a document the user may create a bookmark for the document. The user may then edit a description of the document (pre-sumably, why the document is interesting) in the properties of the bookmark.

Several disadvantages are associated with the use of bookmarks for documents. For instance, the user may completely forget the existence of a relevant bookmark. Also, a user may bookmark the same document twice because the user forgot the first visit to the document. Further, some bookmarks properly belong in several categories, but to do this, the user must add the bookmarks separately to each category. If the bookmark is changed later, the user has to update each bookmark separately. Frequently, when reviewing the bookmarks, a user is at a loss as to why a particular document was marked. The collection of bookmarks can rapidly grow to an unmanageable number rendering the bookmarks useless. Bookmarks are also difficult to share among users. Bookmarks fail to offer much interrelated organization amongst them. Finally, all bookmarks must be added manually. Classes of bookmarks do not self-populate and do not offer a superior method of sharing information amongst peers.

In general, the user sees the digital information space as a loosely connected network in which authors link to their own documents, or the documents of other authors. What is needed is a user-driven model of organization and navigation that more closely maps to the operation of human long-term memory and is easily shared between peers using different computers.

SUMMARY OF THE INVENTION

Accordingly, it is an object of the present invention to provide a navigational model, referred to herein as an "overlay," for linking together information objects on an existing information space.

It is another object of the present invention to provide an overlay separate from the existing information space which allows a user to create a structure of information nodes, concept nodes, and links between nodes.

It is a further object of the present invention to provide for linking together digital information objects from a user's perspective.

It is still another object of the present invention to provide for associating digital information objects using concept nodes to enrich navigation through a digital information space.

It is still a further object of the present invention to provide an overlay part or all of which can be shared with other users, or combined with other overlays to create richer networks of associations.

It is yet a further object of the present invention to permit a user to define concepts with one or more keywords or keyword phrases. Unless otherwise indicated, the terms keyword and keyword phrase are used interchangeably to mean descriptive text entered by a user.

In carrying out the above objects and other objects, the present invention provides a system for linking together digital information objects of a digital information space. The system includes an overlay created by a user and maintained separate from the digital information objects. The overlay includes at least one concept node and at least one information node. Each concept node expresses a concept described by at least one keyword, including combinations of keywords. Each information node represents one of the digital information objects and is linkable to each concept node. A user interface accepts at least one keyword from the user describing the concept of any concept node and also accepts input from the user indicating a digital information object in the digital information space to be accessed. The contents of the accessed digital information object are displayed. At least one user-selectable link associated with each keyword common to both the displayed contents of the accessed digital information object and to any concept described by the keyword is displayed. Each user-selectable link provides access to another digital information object in the digital information space. The other digital information object to which access is provided may be represented by an information node in the overlay linked in the overlay to at least one concept node including the common keyword.

In various embodiments of the present invention, the digital information space can include an Internet, an intranet, a desktop environment, an electronic mail environment, and the like. For example, the overlay can exist on a user computer linked to an Internet and the digital information space includes the Internet.

In another embodiment of the present invention, the at least one concept node is a plurality of concept nodes and the at least one information node is a plurality of information nodes. The user interface can accept user input establishing a link between a first concept node and a second concept node, between a selected concept node and a selected information node, and/or between a first information node and a second information node.

In yet another embodiment of the present invention, the user interface permits the user to add a new information node to the overlay representing the accessed digital information object. The user may annotate the accessed digital information object by storing an annotation in the information node representing the accessed digital information object.

In still another embodiment of the present invention, the overlay exists on at least one server and overlay revisions are received by at least one client served by the server. Overlay revisions may be published by the server to a plurality of clients. The published revisions may be automatically accepted if received from a trusted client. The published revisions may be queued for review if received from an untrusted client.

In a further embodiment of the present invention, the server receives information node usage statistics from clients and prioritizes the information nodes in the overlay based on the usage statistics. Usage statistics may also be used to conditionally remove nodes from the overlay.

In yet a further embodiment of the present invention, the overlay exists on a computer of a first client. Updates to the overlay made by the first client are received by one or more second clients.

In still a further embodiment of the present invention, the overlay is sent to at least one search engine. The overlay receives search results including at least one information node for adding to the overlay.

In yet a still further embodiment of the present invention, the overlay is associated with at least one news service. The user interface displays news articles provided by the news service based on at least one concept in the overlay.

A method of user controlled, dynamic linking of digital information objects in a digital information space is also provided. An overlay is created distinct from any digital information object in the digital information space. Input from a user establishing at least one concept node in the overlay is accepted. Each concept node includes at least one keyword phrase establishing a concept. User input establishing at least one information node in the overlay is accepted. Each information node represents a digital information object in the digital information space. Each information node is associated with any concept node including a concept common to both the information node and the concept node. The contents of a selected digital information object are scanned for any keyword phrase included in each concept node. A user-selectable link is displayed for each keyword phrase found in the scanned contents. Each user-selectable link provides access to at least one related digital information object. The information node representing the related digital information object is associated with at least one concept node including at least one keyword phrase found in the scanned contents.

A method of sharing information linking together digital information objects is also provided. An overlay including at least one concept node is created. A digital information object accessed and a link established between the digital information object and each concept node expressing at least one concept commonly expressed by the digital information object and the concept node. At least one concept node is exported from the overlay for use in at least one other overlay.

A system for linking together digital information objects of a digital information space is also provided. The system includes at least one overlay maintained outside of the digital information space. At least a portion of the overlay is passed to an agent for information processing. A link between an accessed digital information object and each concept node in the overlay is established by the user if the accessed digital information object and the overlay include at least one common concept.

The above features, and other features and advantages of the present invention are readily apparent from the following detailed descriptions thereof when taken in connection with the accompanying drawings.

BRIEF DESCRIPTION OF THE DRAWINGS

FIG. 9 illustrates an exemplary user interface showing presentation of overlay information when browsing the digital information space.

DETAILED DESCRIPTION OF THE PREFERRED EMBODIMENT(S)

Figure 1:
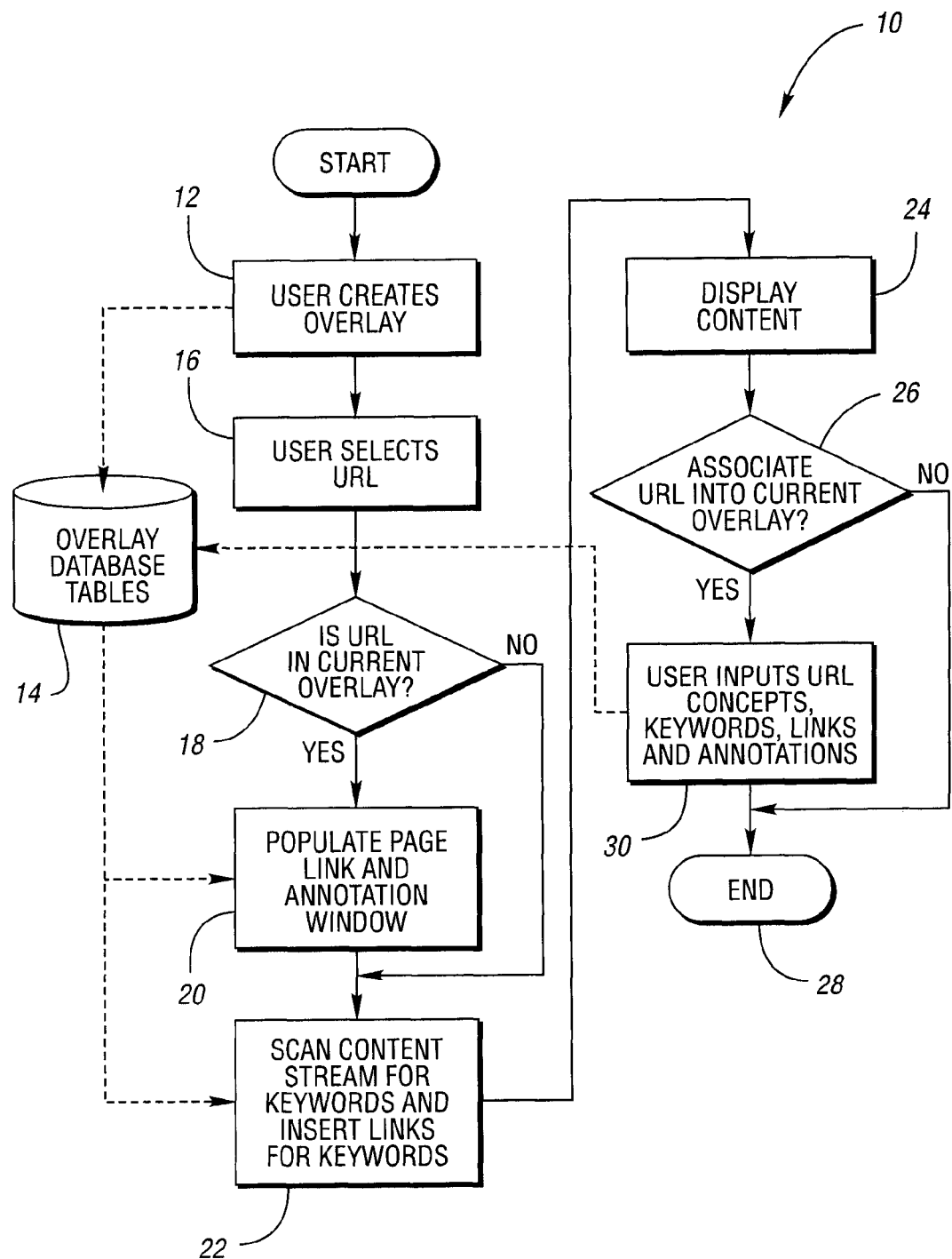
FIG. 1 is a flow diagram representing operation of the present invention.

Referring now to FIG. 1, flow diagram 10 representing operation of the present invention is shown. The present invention is preferably for use by a user traveling through a digital information space such as the World Wide Web (WWW). However, the present invention allows the user to organize and navigate any digital information space made up of addressable objects.

The user creates an overlay as shown by block 12. An overlay is a means of organizing digital information from the perspective of the user. An overlay provides a user with the means for associating digital information, such as a desired document, with concepts, keywords, other documents located on the WWW, and annotations. The overlay itself is, preferably, a locally stored software artifact such as a file or a set of tables in database 14. The overlay does not affect the digital information space directly, nor does it replicate the digital information.

There are a variety of ways in which the information of an overlay may be represented. However, the content of an overlay preferably includes an index of URLs in the overlay; an index of overlay concepts, each concept described by keywords associated with the concept; and data on each URL containing the concepts associated with an accessed document, annotations associated with the document, and user defined document links for the document. In each overlay, data associated with each URL is grouped into an information node and data associated with each concept is grouped into a concept node. Related nodes are interconnected by links. This graphical view of an overlay is further described with regards to FIG. 5 below.

A user selects a URL in block 16. An addressable object, such as a page on the WWW specified by the URL, is accessed by the user. This may occur, for example, as the user moves through the WWW with the aid of a standard browser.

A check is made to see if the URL selected is in the current overlay in block 18. If not, the content stream is scanned as described with regards to block 22 below. If the selected URL is in the current overlay, page links and annotation windows are populated prior to scanning the contents stream. The current overlay and other overlays which have been generated in the past are stored in overlay database tables 14. The user may choose which overlay from overlay database tables 14 to designate as the current overlay.

Page link and annotation windows are populated in block 20. If the URL is associated with the current overlay, the overlay display is automatically populated with the links to other relevant documents and annotations already associated with the URL. An example of a dialog window that may be used to implement the overlay display is shown with regards to FIG. 2 below.

The content stream of the accessed document is scanned for keywords and, if keywords are found, links are inserted in block 22. Text strings within the content stream of an addressable object such as, for example, a web document, are searched for instances of keywords describing concepts associated with the current overlay. For each keyword found, an association is made to any other addressable object listed in the current overlay associated with a concept described by the found keyword.

Once scanned, the document is displayed for the user to view as shown by block 24. The user is permitted to add the URL to the current overlay in block 26. When the user adds a digital information object to the overlay, an information node representing the digital information object is created in the overlay. If the URL is not added into the current overlay then the operation of the present invention is terminated as shown by block 28. If the URL is associated to the current overlay, the user may input concepts, keywords, links to other documents relevant to the desired document, and annotations associated with the desired document as shown by block 30.

Typically, when an overlay is created, the user associates keywords with each concept. For instance, the concept "dog" may have the associated keywords "poodle" and "dalmatian." The user may link concepts to the desired document. For example, the desired document may be the "American Kennel Club" WWW homepage which may be linked to the concept "dog." The user may also generate links to other documents relevant to the desired document. For example, the "American Kennel Club" WWW homepage may be linked in the overlay with other canine related WWW pages. Finally, the user may input annotations containing thoughts, ideas, etc., on why the desired document is interesting. For instance, the user may input "this homepage includes a directory of the American Kennel Club members."

When a document is displayed, the keywords contained in the document are highlighted to define overlay links. Various methods for highlighting are available including using a different color, changing from normal to bold, changing from normal to italics, changing the font, changing the point size, putting an outline around the keyword, etc. The manner in which an overlay-defined link is indicated should be under the control of the user.

If the user selects a highlighted keyword in the accessed document, a pop-up menu appears. The pop-up menu includes the titles of all the documents that have been linked to the concept described by the highlighted keyword. The pop-up menu may also list information nodes related to one or more activated concepts.

Thus, rather than having to make the association manually and then locate the documents related to the desired document, the association between the documents has been made automatically and dynamically. The association occurs because the accessed document expresses one or more concepts in common with the linked documents. The association is expressed in the overlay by identifying the concept nodes expressing each concept found in the accessed document and then finding the information nodes linked to the identified concept nodes. The information nodes so found are associated to the accessed document through common concepts.

Figure 2:
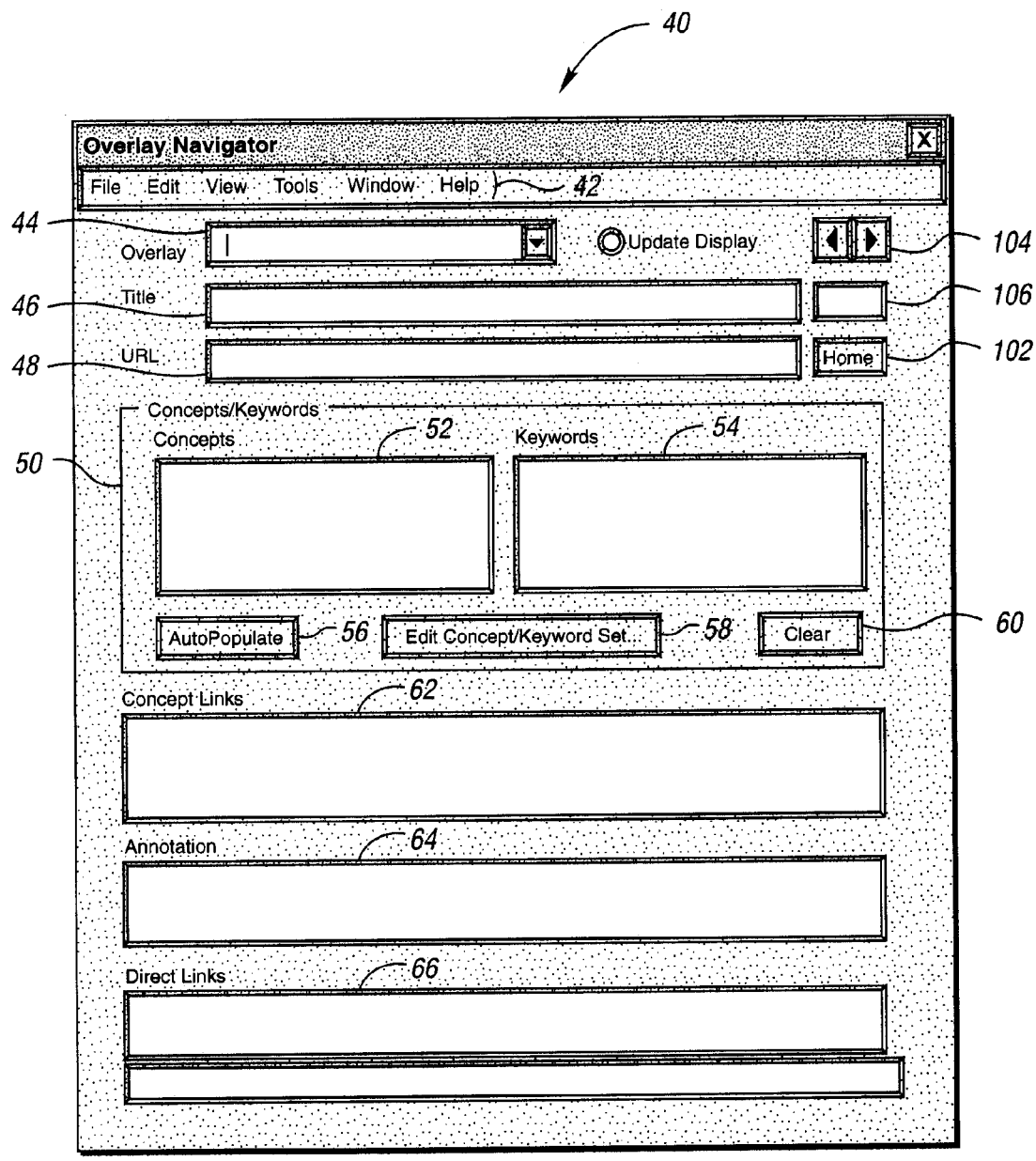
FIG. 2 illustrates a window for creating and browsing an overlay.

Referring now to FIG. 2 with continual reference to FIG. 1, an overlay navigator window 40 for creating and browsing an overlay is shown. Window 40 is preferably part of the browser used by a user to travel through the digital information space. The user invokes a command to bring up window 40 to create an overlay. This procedure is related to the procedure described above with regard to block 12 of FIG. 1.

Window 40 includes a menu bar 42 and an overlay name input box 44. As part of information node creation, the user enters a name for the overlay in overlay name input box 44. Window 40 further includes a concepts/keywords area 50 having a concepts area 52, a keywords area 54, an edit concept/keyword set button 58, and a clear button 60.

Figure 3:
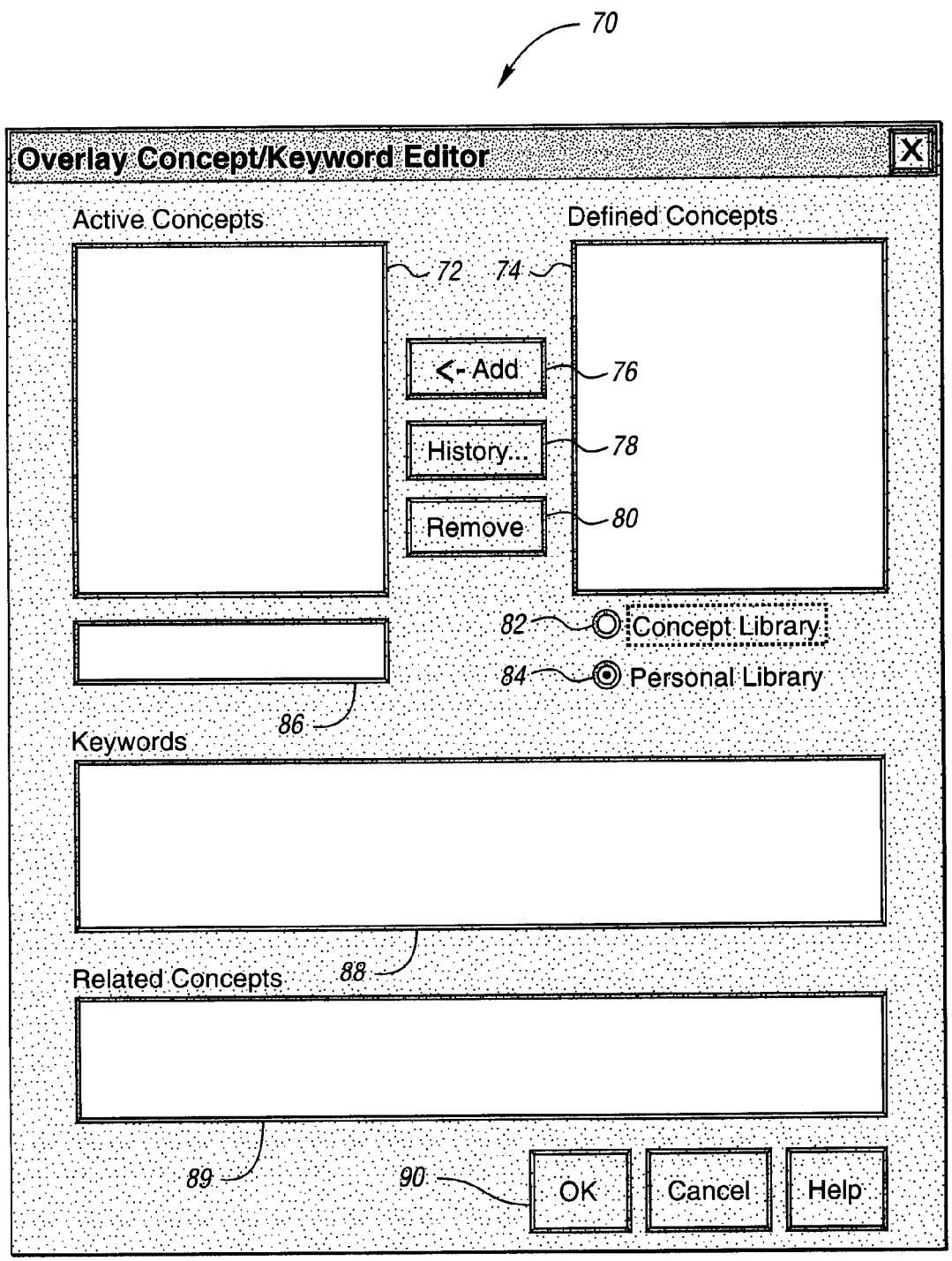
FIG. 3 illustrates a dialog for adding or modifying concept nodes and associated keywords.

After entering a name in the overlay name input box 44, the user activates the edit concept/keyword set button 58 to bring up a dialog 70 shown in FIG. 3. The user uses the dialog 70 for associating concepts and keywords with the overlay. Dialog 70 includes an active concepts area 72, a defined concepts area 74, an add button 76, a history button 78, and a remove button 80. Dialog 70 further includes a concept library radio button 82, a personal library radio button 84, and an active concept input area 86. Finally, dialog 70 includes a keywords area 88, a related concepts area 89, and a button 90.

Initially, the user may activate the concept library radio button 82 to bring up a list of predefined concepts in the defined concepts area 74. Each of the predefined concepts in defined concepts area 74 includes associated keywords listed in the keywords area 88. The user may click on a concept listed in the defined concepts area 74 and then click the add button 76 to list the chosen concept in active concepts area 72. The user may add other concepts listed in the defined concepts area 74 to the active concepts area 72. Similarly, the user may remove concepts listed in the active concepts area 74 by clicking on a concept and then clicking the remove button 80.

In addition to choosing from predefined concepts to associate with the desired document, the user may add personally defined concepts to the active concepts area 72. To do this, the user initially clicks on the personal library radio button 84, then types a concept within the active concept input area 86, then types keywords to be associated with the concept within the keywords area 88, and then clicks the add button 76. As an example, the user may define the concept "Scottish fold" with the keywords "Scottish fold" and "folded ear."

Preferably, Boolean logic modifiers can be employed when associating keywords with concepts. For instance, the user may define the concept "poodle" with the keyword "poodle", but not the keyword "poodle skirt" by typing "NOT 'poodle skirt'" within the keywords area 86.

After entering concepts and associated keywords for the desired document into the various input boxes of dialog 70, the user clicks the OK button 90 to move back to the window 40.

Window 40 may also be used to create new information and concept nodes. This function may be associated with the block 30 in FIG. 1 above. To support this functionality, the window 40 includes a title input box 46, a URL input box 48, an autopopulate button 56, a concepts link area 62, an annotation area 64, and a direct links area 66.

If window 40 is open when the user accesses a document, the title of the accessed document is automatically entered into the title input box 46 and the URL of the document is automatically entered into the URL input box 48. The user may now add concept links to the concept links area 62, annotations to annotations area 64, and direct links to the direct links area 66 for the desired document. A concept link is a link between two concept nodes within an overlay. A direct link is a user defined link from one document to another document.

Instead of manually associating concepts and keywords with the accessed document by clicking the edit/concept keyword set button 58, the user may click the autopopulate button 56 to do this automatically. An advantage of the present invention is that the browser examines the textual content of the document when the user clicks the autopopulate button 56 to look for keywords or keyword synonyms stored in the overlay that are also in the document. The present invention uses keywords to identify concepts present in the text and suggests associating the document with those concepts. The user may agree to this and then decide to edit the concepts and keywords further by clicking the edit concept/keyword set button 58. The user may also edit the concept links, the annotations, and the direct links as desired. In an embodiment of the present invention, a thesaurus is included. The document search could then include common synonyms for keywords. This feature may be under user control since the synonyms may generate false positive matches that are less likely to correspond to what the user is considering.

An important advantage of the present invention is that the browser highlights found keywords in the document to defined overlay links. When the user moves a pointer over a found keyword, a pop-up menu appears showing all documents that have been linked to the concept associated with the matched keyword together with other information such as information nodes related to common concepts. In essence, the association between documents has been done automatically and dynamically rather than manually. Thus, instead of the user attempting to remember a relevant document that has been bookmarked and then wade through the bookmark folder hierarchy, the presence of keywords has already activated the relevant concepts and generated a menu of links. This process is illustrated in FIG. 9.

In a preferred embodiment, the concepts area 52 of dialog 40 shows a strength of association of concepts with the document. The strength of association may be shown by sorting the concepts or by placing a numeric value next to the concept. The user should be able to select the method of indicating strength of association.

Another advantage of the present invention is that the overlay can be shared with others. For instance, assets of the overlay are downloadable in the same manner as any other file and may be made globally available on the WWW. Further, overlays are additive; they may be combined automatically or selectively. Implementations of such a distributed overlay approach are described with regard to FIG. 7 and FIG. 8.

Overlays may have a defined starting point. This provides the user with a trailhead from which exploration may begin. A user creating an overlay with the intent to share may place trail markers on individual links (this would presumably be done via the overlay dialog for a specific document). By invoking a "next" command, an individual viewing another user's overlay can be taken on a guided tour of the associative trail.

To get to the starting point of an overlay, the user would click a home button 102 of dialog 40. The user can flip backward and forward through the links by clicking arrow buttons 104. A display 106 shows a sequence number as the user moves through the links.

Figure 4:
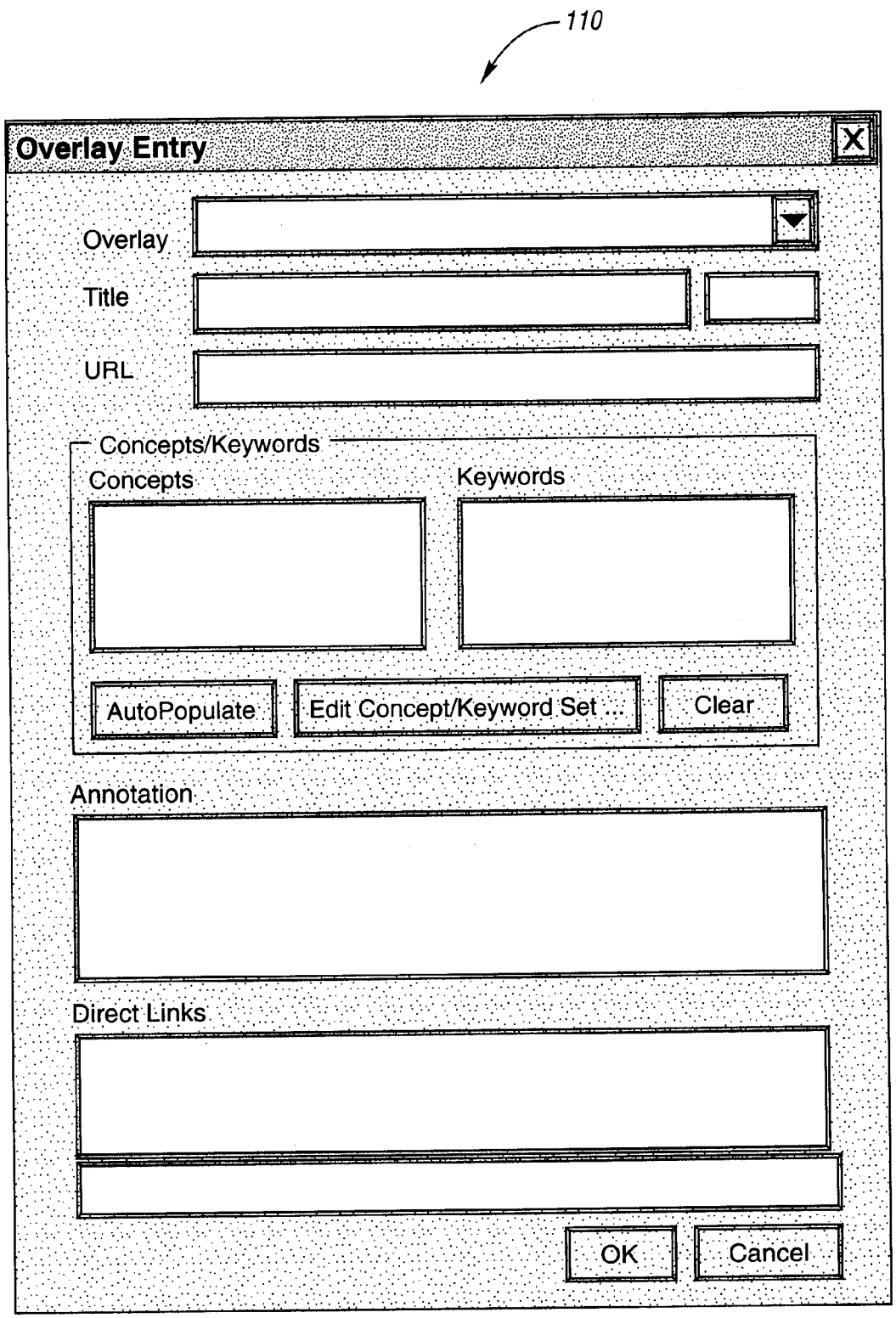
FIG. 4 illustrates a dialog for adding or modifying information nodes.

Referring now to FIG. 4, a dialog for adding a node to an overlay is illustrated. Window 40 is designed to be the user interface for a stand alone application. In an embodiment, some or all of the present invention may be incorporated into a standard browser. A dialog, such as dialog 110, may be popped up from within the browser to provide access to choose the options described above. Dialog 110 permits the creation and editing of an information or concept node from within the browser.

The overlay makes the entire digital information space significantly more usable for individuals and work groups, yet without requiring changes to that information space. Information providers could create enhanced documents that come predefined with associative keywords or general links built in; users would selectively decide which keywords or links to import into their own overlay, or could reject all author suggestions and form links in some other, unique manner.

Figure 5:
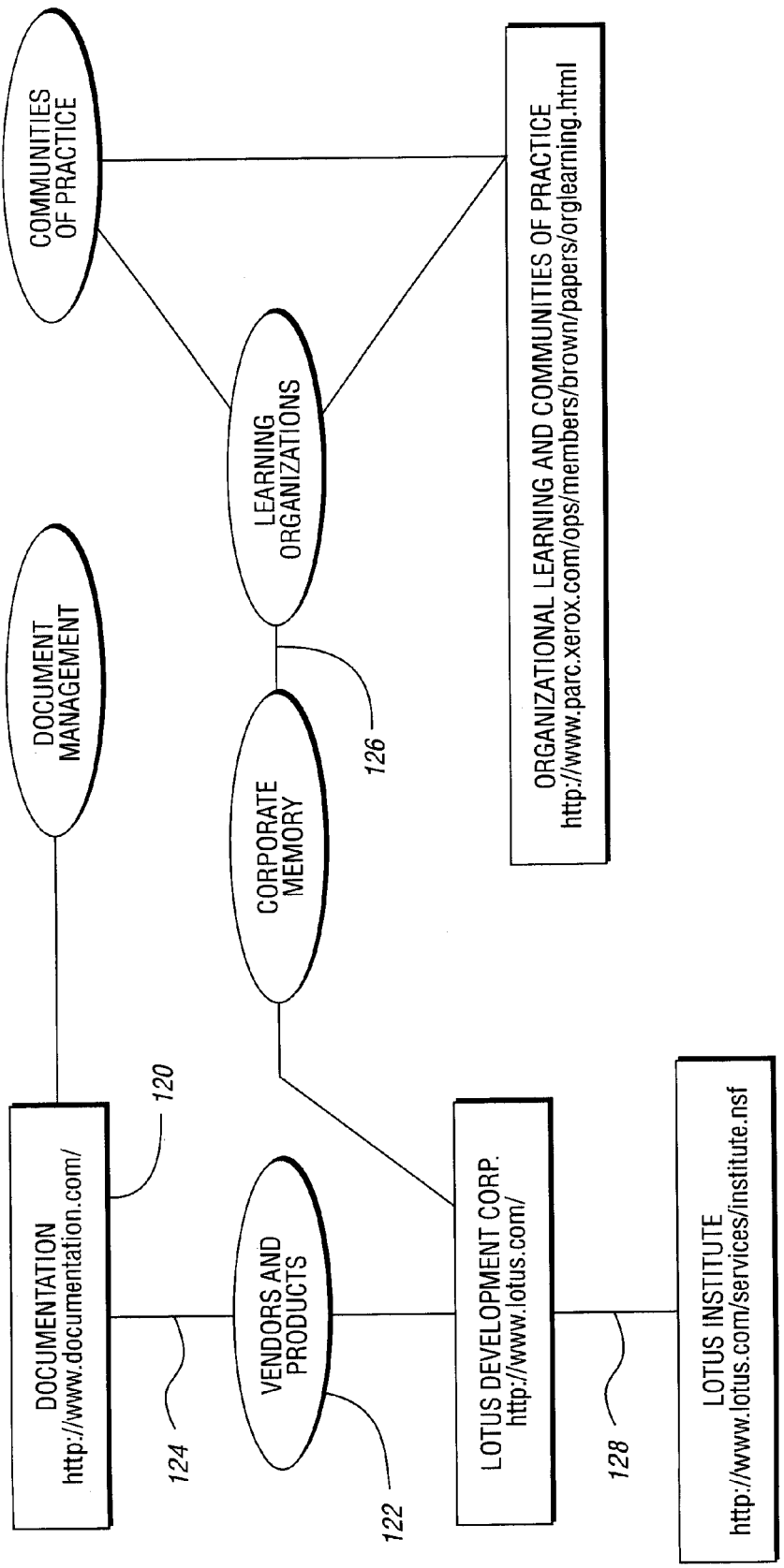
FIG. 5 illustrates an exemplary display of information nodes, concept nodes, and links between nodes.

Referring now to FIG. 5, an illustration of an exemplary display including information nodes, concept nodes, and associated links is shown. In a preferred embodiment of the present invention, a user can obtain a graphical image of relationships held within the overlay. Information nodes, one of which is shown by 120 and concept nodes, one of which is shown by 122, are connected by links. Information-concept links, one of which is indicated by 124, indicate the information nodes 120 which contain keywords defining the associated concept 122. Information-concept links may be manually established by the user or may be automatically generated. Concept-concept links, one of which is shown by 126, connect the concept nodes 122. These connections are manually defined by the user. Information-information links, one of which is indicated by 128, indicate links from one information node to another that have been manually established by the user.

In an embodiment of the present invention, an overlay is submitted to a search engine modified to accept overlays. The search engine uses the concept nodes and their keywords to assemble finely detailed and optimized search patterns. Information nodes already stored in the overlay could be used to further refine the search. A user would examine the search results and decide on a case-by-case basis which new information nodes should be added to the overlay. This may be used, for example, as a proactive alternative to or augmentation of individual searches performed at the time of need. As such, the overlay could be uploaded to a search engine on a regular basis.

In another embodiment of the present invention, an overlay is used in conjunction with a news service to create a daily news collection customized to the interests of the user. An entirely daily news site may be automatically searched for occurrences of keywords associated with concept nodes of the overlay. News stories that contain concepts similar to that of the overlay analog be collected and presented to the user.

Figure 6:
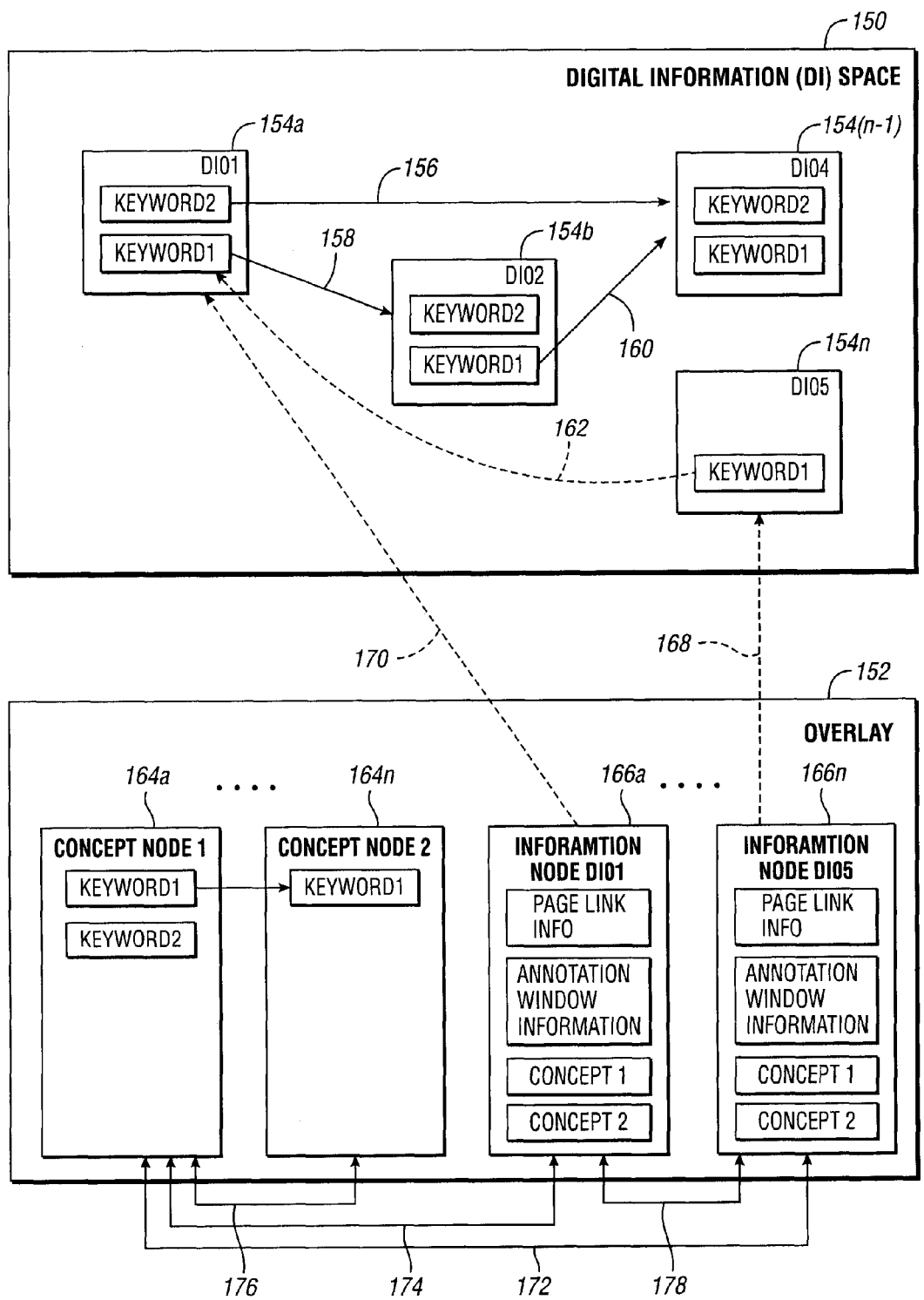
FIG. 6 is a block diagram illustrating a system including an overlay according to an embodiment of the present invention.

Referring to FIG. 6, a block diagram illustrating a system including an overlay according to an embodiment of the present invention is shown. A system according to the teachings of the present invention generally comprises a digital information space 150 and an overlay 152. In one example, the digital information space 150 may be the Internet. The overlay 152 is generally stored on one or more personal computers or servers separate from digital information space 150. Digital information space 150 includes a number of digital information objects 154a-n as indicated by the labels DI01, DI02, DI04 and DI05. In one example, digital information objects 154 correspond to WEB pages on the Internet. Each digital information object 154 may contain links to other digital information objects 154 based on code within the digital information objects, as indicated by reference numerals 156, 158 and 160.

Digital information objects 154 may be linked to one another by overlay-generated hyperlinks, one of which is indicated by reference numeral 162. Overlay 152 generally comprises one or more concept nodes 164a-n and one or more information nodes 166a-n. One or more keyword phrases may be associated with each concept node 164, embodying the concept of the concept node. Each information node 166 represents a digital information object in digital information space 150 and contains a link to the respective digital information object, as shown by reference numerals 168 and 170. This link may be the address of digital information object 154 within digital information space 150. The information nodes 166 are linked to relevant concept nodes, as illustrated by reference numerals 172 and 174, that share a common concept. Thus, link 162 is established between digital information objects 154. However, link 162 does not exist in digital information space 150, but rather is a construct established solely within overlay 152.

Each information node 166 may also contain information about associated digital information object 154, such as page link information, annotation window information, concepts related to the information node, and the like. Additionally, a user may manually establish a link 176 between similar concepts in the concept nodes 164a and 164n and a link 178 between the different information nodes 164a and 164n.

Figure 7:
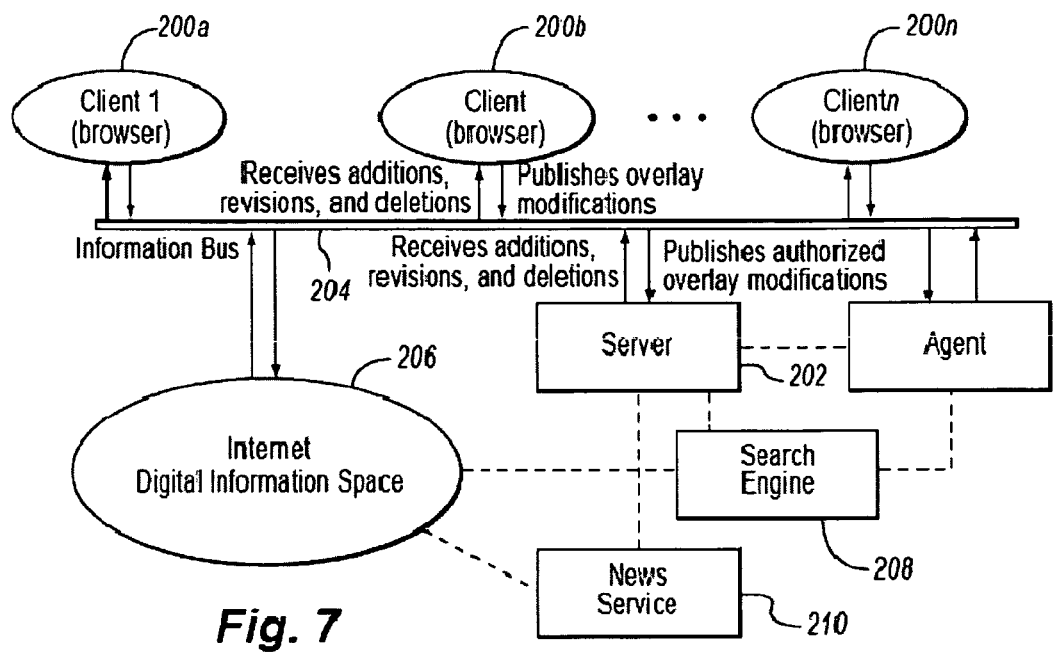
FIG. 7 is a block diagram illustrating a client/server implementation according to an embodiment of the present invention.

Referring to FIG. 7, an exemplary client/server implementation of the present invention is shown. The client/server implementation may comprise a number of clients 200a-n, a server 202, an information bus 204 such as a network, and a digital information space 206. The overlay may be hosted on the server 202. The server 202 receives additions, revisions and/or deletions to the overlay and published authorized overlay modifications to the clients 200a-n through the information bus 204. Each of the clients 200a-n receives additions, revisions, and/or deletions to the overlay structure and publishes overlay modifications to the server over the information bus 204. In one example, the information bus 204 may be a local area network (LAN) connected to the Internet 206 through a security filter or firewall, not shown.

In an embodiment of the present invention, each user has access to one or more search engine 208 through one or more of server 202, Internet 206, information bus 204, and the like. Each user has the ability to pass an overlay to an agent capable of breaking the overlay into multiple searches against search engine 208. The search results generates a list of potential new overlay nodes for the user to approve or discard. Nodes that already exist in the overlay, or which have been "forgotten," need not be included.

In another embodiment of the present invention, each user has access to one or more news services 210 through one or more of server 202, Internet 206, information bus 204, and the like. Each user has the ability to pass an overlay to an agent that uses the overlay in conjunction with news service 210 to create a "newspaper" customized to concepts expressed in the overlay. The newspaper could be made available to the user on a regular basis.

Figure 8:
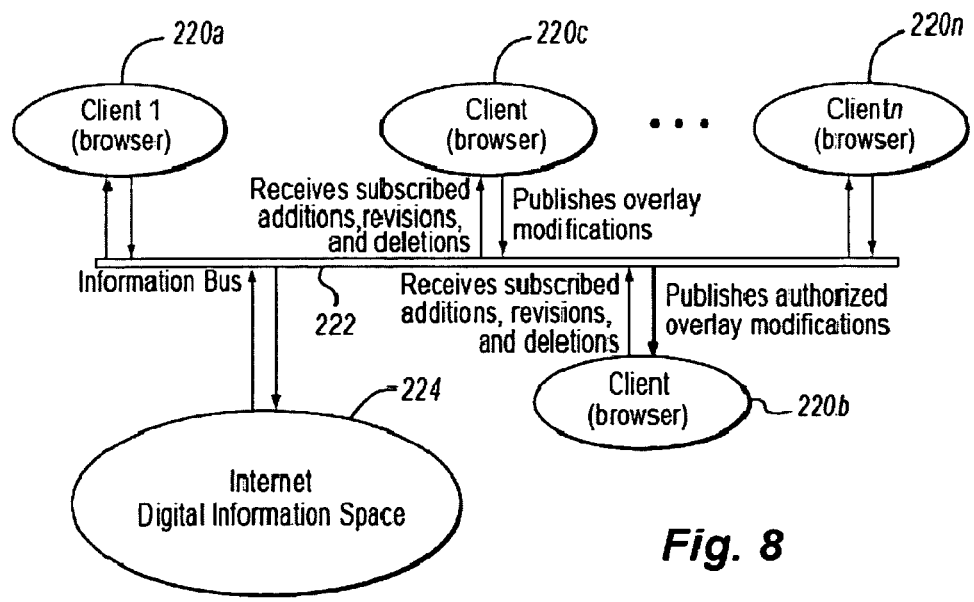
FIG. 8 is a block diagram illustrating a peer-to-peer networking implementation according to an embodiment of the present invention.

Referring to FIG. 8, an exemplary peer-to-peer implementation of the present invention is shown. The peer-to-peer implementation generally comprises a number of clients 220a-n communicating over an information bus 222. The information bus 222 may be connected to a digital information space 224. Each of the clients 220a-n may host a copy of an overlay for its own use and may publish overlay modifications to the information bus 222. Each of the clients 220a-n may receive subscribed additions, revisions and/or deletions to the overlay structure and may automatically incorporate the changes to its overlay if the changes arrive from a trusted peer (e.g., client 220a-n). Otherwise, changes may be queued for review by the user before changes are made. The peer-to-peer implementation of FIG. 8 may be a distributed implementation of the present invention.

Referring to FIG. 9, an exemplary WEB browser user interface through which a user is presented with overlay information when browsing the digital information space is shown. A browser window 240 may load a digital information object, such as a WEB page, accessed by the user. The digital information object is be scanned for occurrences of keywords 242 within concept nodes 164a-n. In the example of FIG. 9, "knowledge management" is one such keyword phrase. From the keyword phrase "knowledge management," the user is provided with overlay based hyperlinks in the form of cascading menus 244. Cascading menus 244 present the user with related information nodes 166a-n based on similar concepts within the overlay.

The present invention has been described in conjunction with specific embodiments. However, it is evident that many alternatives, modifications, and variations are possible. For instance, in addition to using overlays for the organization and navigation of WWW documents, the overlays can be used for organizing email. In operation, when a user encounters an email that is to be saved, rather than moving the email to a folder, the user would open an overlay dialog and select the concepts by which the email should be indexed. The user would be able to browse through the concepts and view which messages are relevant to which concepts. In addition, new email could be scanned for keywords and then linked to other email having the concepts associated with the matched keywords.

As another example, the digital information space may be a desktop environment. In this case, the addressable objects include each addressable location accessible from the desktop environment. These objects include WWW sites, emails, local documents, or shared network files.

Other applications for the present invention include database entries as may be specified by an SQL query, a slide in a presentation program file, or a sheet in a spreadsheet. A digital information object is anything on a computer that can be uniquely addressed.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for linking together digital information objects of a publically-available digital information space comprising:
   at least one locally-stored software artifact overlay maintained (i) on a computer comprising a web browser and (ii) separate from the publically available digital information space, wherein, at least a portion of the at least one locally-stored software artifact overlay is passed to a digitally-readable agent for information processing;
   at least one digitally-readable concept node within each overlay, each digitally-readable concept node expressing one concept, each concept defined by at least one keyword; and
   at least one digitally-readable information node within each overlay, each digitally-readable information node representing one of the digital information objects;
   wherein a link between an accessed digital information object in the digital information space and each of the at least one digitally-readable concept node is automatically established when the accessed digital information object and the overlay include at least one common concept, the link being omitted absent at least one common concept; and wherein Boolean logic modifiers are used to associate the at least one keyword with each concept.

2. The system of claim 1 wherein the information processing comprises generating a list of new potential information nodes based on any portion of the at least one overlay passed to the agent.

3. The system of claim 1 wherein the information processing comprises creating a customized news collection based on any portion of the at least one overlay passed to the agent.

4. The system of claim 1 wherein, the locally-stored software artifact overlay does not affect information located in the publically-available digital information space.

5. The system of claim 1 wherein, the locally-stored software artifact overlay comprises,
 an index of URLs in the overlay;
 an index of overlay concepts described by keywords associated with the concept;
 data on each of the URLS in the overlay; and
 annotations.

6. The system of claim 1 wherein, the link between the accessed digital information object in the digital information space and each of the at least one digitally-readable concept node is automatically established if the accessed digital information object and the overlay include at least one common concept, the link being omitted absent at least one common concept comprises,
 checking to see if a selected URL is in the at least one locally-stored software artifact overlay;
 automatically populating the overlay with links to additional digital information objects and annotations associated with the URL; and further comprising,
 automatically populating the digital information object with links to additional websites and additional annotation windows when the digital information object comprises at least one keyword found in the concept node that did not previously have any links or annotations associated with the keyword.

7. The system of claim 6 wherein, automatically populating the digital information object with links to additional websites and additional annotation windows when the digital information object comprises at least one keyword found in the concept node that did not previously have any links or annotations associated with the keyword comprises,
 initiating an automatic session;
 automatically scanning the digital information object for the at least one keyword; and
 automatically associating any found at least one keyword with at least one of one or more information nodes and one or more concept nodes listed in the overlay.

8. The system of claim 7 wherein, automatically scanning the digital information object for the at least one keyword comprises scanning the digital information object for the at least one keyword synonym.

9. The system of claim 1 further comprising, an overlay navigator window adapted to create and browse the at least one locally-stored software artifact overlay, the overlay navigator window comprising a portion of a web browser; and wherein,
 when the overlay navigator window is open and a digital information object is accessed,
  the title of the accessed object is automatically obtained and entered into the overlay navigator window, and the URL of the accessed object is automatically entered into the overlay navigator window.

10. The system of claim 1, wherein, the concept node further comprises at least one user-defined concept; and further comprising,
 a device adapted to indicate a strength of association of concepts in the concept node.

11. The system of claim 1 wherein, the at least one locally-stored software artifact overlay comprises,
 a device adapted to send a user to a document comprising a first link in the at least one locally-stored software artifact overlay; and
 a device adapted to allow a user to browse through additional links in the at least one locally-stored software artifact overlay.

12. The system of claim 1 wherein, the at least one locally-stored software artifact overlay comprises is non-publicly maintained on the computer.

13. The system of claim 1 wherein, the at least one locally-stored software artifact is accessible only through the web browser.

14. A system for linking together digital information objects of a publically-available digital information space comprising:
 at least one locally-stored software artifact overlay maintained (i) on a computer comprising a web browser and (ii) separate from the publically available digital information space, wherein, at least a portion of the at least one locally-stored software artifact overlay is passed to a digitally-readable agent for information processing;
 at least one digitally-readable concept node within each overlay, each digitally-readable concept node expressing one concept, each concept defined by at least one keyword;
 at least one digitally-readable information node within each overlay, each digitally-readable information node representing one of the digital information objects; and
 a device adapted to at least one of add and remove at least one pre-defined concept to and from the digitally-readable concept node;
 wherein:
  a link between an accessed digital information object in the digital information space and each of the at least one digitally-readable concept node is automatically established when the accessed digital information object and the overlay include at least one common concept, the link being omitted absent at least one common concept;
  the digital information object is displayed to the user with at least one highlighted keyword; and
  a pop-up menu comprising additional publicly-available digital information objects appear when a user selects the at least one highlighted keyword.

15. A system for linking together digital information objects of a publically-available digital information space comprising:
 at least one locally-stored software artifact overlay maintained (i) on a computer comprising a web browser and (ii) separate from the publically available digital information space, wherein, at least a portion of the at least one locally-stored software artifact overlay is passed to a digitally-readable agent for information processing;
 at least one digitally-readable concept node within each overlay, each digitally-readable concept node expressing one concept, each concept defined by at least one keyword;
 at least one digitally-readable information node within each overlay, each digitally-readable information node representing one of the digital information objects; and a device adapted to at least one of add and remove at least one pre-defined concept to and from the digitally-readable concept node;

wherein a link between an accessed digital information object in the digital information space and each of the at least one digitally-readable concept node is automatically established when the accessed digital information object and the overlay include at least one common concept, the link being omitted absent at least one common concept.

16. A system for linking together digital information objects of a publically-available digital information space comprising:

at least one locally-stored software artifact overlay maintained (i) on a computer comprising a web browser and (ii) separate from the publically available digital information space, wherein, at least a portion of the at least one locally-stored software artifact overlay is passed to a digitally-readable agent for information processing;

at least one digitally-readable concept node within each overlay, each digitally-readable concept node expressing one concept, each concept defined by at least one keyword;

at least one digitally-readable information node within each overlay, each digitally-readable information node representing one of the digital information objects; and one or more documents located on a server having one of predefined keywords and built-in links adapted to be received by the locally-stored software artifact overlay;

wherein a link between an accessed digital information object in the digital information space and each of the at least one digitally-readable concept node is automatically established when the accessed digital information object and the overlay include at least one common concept, the link being omitted absent at least one common concept.

17. A system for linking together digital information objects of a publically-available digital information space comprising:

at least one locally-stored software artifact overlay maintained (i) on a computer comprising a web browser and (ii) separate from the publically available digital information space, wherein, at least a portion of the at least one locally-stored software artifact overlay is passed to a digitally-readable agent for information processing;

at least one digitally-readable concept node within each overlay, each digitally-readable concept node expressing one concept, each concept defined by at least one keyword;

at least one digitally-readable information node within each overlay, each digitally-readable information node representing one of the digital information objects; and a publically-available digital information space search engine adapted to, accept the at least one locally-stored software artifact overlay; and use the concept nodes and the at least one keyword to assemble optimized searches;

wherein a link between an accessed digital information object in the digital information space and each of the at least one digitally-readable concept node is automatically established when the accessed digital information object and the overlay include at least one common concept, the link being omitted absent at least one common concept.

18. The system of claim 17 wherein, the publically-available digital information space search engine comprises a news service search engine; and the optimized searches comprises searching a daily news site.

* * * * *

UNITED STATES PATENT AND TRADEMARK OFFICE
CERTIFICATE OF CORRECTION

| | |
|---|---|
| PATENT NO. | : 7,930,324 B2 |
| APPLICATION NO. | : 11/687232 |
| DATED | : April 19, 2011 |
| INVENTOR(S) | : Jeffrey D. Kenyon et al. |

It is certified that error appears in the above-identified patent and that said Letters Patent is hereby corrected as shown below:

Column 1, Line 31, delete "(pre-sumably), why" and insert --(presumably), why--, therefor.

Column 8, Line 49, delete "analog be collected" and insert --analog can be collected--, therefor.

Column 10, Line 8, delete "object is be" and insert --object is to be--, therefor.

Signed and Sealed this
Sixth Day of September, 2011

David J. Kappos
*Director of the United States Patent and Trademark Office*